United States Patent
Harshavardhana et al.

(10) Patent No.: US 7,426,179 B1
(45) Date of Patent: Sep. 16, 2008

(54) METHOD AND APPARATUS FOR SIGNALING PATH RESTORATION INFORMATION IN A MESH NETWORK

(75) Inventors: Paramasiviah Harshavardhana, Marlboro, NJ (US); Oded Hauser, Matawan, NJ (US); Frank N. Hujber, Mercerville, NJ (US); Randolph Roy Kutz, Howell, NJ (US); Yufei Wang, Holmdel, NJ (US); Cathy Zima, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1477 days.

(21) Appl. No.: 09/528,762

(22) Filed: Mar. 17, 2000

(51) Int. Cl.
*H04L 12/437* (2006.01)

(52) U.S. Cl. .............. 370/219; 370/222; 370/244; 370/538

(58) Field of Classification Search ............... 370/216, 370/225, 226, 227, 228, 243, 248
See application file for complete search history.

(56) References Cited

U.S. PATENT DOCUMENTS

| | | | |
|---|---|---|---|
| 4,956,835 A | 9/1990 | Grover | |
| 5,093,824 A | 3/1992 | Coan et al. | |
| 6,021,113 A | 2/2000 | Doshi et al. | |
| 6,073,248 A | 6/2000 | Doshi et al. | |
| 6,278,689 B1 * | 8/2001 | Afferton et al. | 370/223 |
| 6,324,162 B1 * | 11/2001 | Chaudhuri | 370/225 |

(Continued)

FOREIGN PATENT DOCUMENTS

EP 0 895 380 A 2/2003

OTHER PUBLICATIONS

W. D. Grover, "The Selfhealing™ Network, A Fast Distributed Restoration Technique for Networks Using Digital Crossconnect Machines," Globecom '87, pp. 1090-1095.

(Continued)

*Primary Examiner*—Chi H. Pham
*Assistant Examiner*—Soon D. Hyun

(57) ABSTRACT

A method and apparatus are disclosed for monitoring and signaling a path restoration using pre-computed restoration paths following a detected fault on a primary service path in a communications network. A fault occurring inside the restorable portion of a network in heterogeneous or multiple network environments can be distinguished from faults occurring outside the restorable network in accordance with the ANSI Tandem Connection Maintenance standard, T1.105.05-1994. Path restoration is activated only when a fault causing path failure occurs inside the restorable portion of the network. Each conforming node in the restorable portion of the network has the necessary monitoring, signaling and cross-connect functionality and databases to participate actively in real time restoration. Additional non-conforming network elements can be positioned between the restoration nodes without preventing path restoration. With the signaling architecture of the present invention, when an end-node detects a path failure caused by an in-network fault, it formulates a signaling message for restoring the failed path. The restoration signaling message is thereafter relayed from one node to another in the overhead or payload of signaling paths that occupy the same bandwidth that is subsequently used by the restoration path. Once a signaling message is transmitted to an adjacent node in the overhead or payload of a particular signaling path, the node that transmitted the message makes a cross-connect that replaces the signaling path with a segment of the restoration path whose set-up was requested in the transmitted signaling message.

42 Claims, 7 Drawing Sheets

U.S. PATENT DOCUMENTS 6,452,906 B1 * 9/2002 Afferton et al. ............. 370/242
6,587,235 B1 * 7/2003 Chaudhuri et al. .......... 370/216

OTHER PUBLICATIONS

Anderson et al., "Fast Restoration of ATM Networks," IEEE Journal on Selected Areas in Communications, vol. 12, No. 1 Jan. 1994, pp. 128-138.

American National Standard for Telecommunications, "Synchronous Optical Network (SONET)—Tandem Connection Maintenance," ANSI T1.105.05-1994, pp. 1-22 (1994).

Doshi, et al., "Optical Network Design and Restoration," Bell Labs Technical Journal, pp. 1-84 (Jan.-Mar. 1999).

Bellcore, "Generic Criteria for SONET Digital Cross-Connect Systems," Generic Requirements, GR-2996-CORE, Issue 1, pp. 2-1 to 2-6B (Jan. 1999).

Bellcore, "Generic Criteria for SONET Digital Cross-Connect Systems," Generic Requirements, GR-2996-CORE, Issue 1 pp. 3-1 to 3-22 (Jan. 1999).

Bellcore, "Generic Criteria for SONET Digital Cross-Connect Systems," Generic Requirements, GR-2996-CORE, Issue 1 pp. 4-1 to 4-3 (Jan. 1999).

Bellcore, "SONET Dual-Fed Unidirectional Path Switched Ring (UPSR) Equipment Generic Criteria," A module of TSGR, FR-440, Generic Requirements, GR-1400-CORE, Issue 2, pp. 4-11 to 4-14 (Jan. 1999).

Bellcore, "Synchronous Optical Network (SONET) Transport Systems: Common Generic Criteria," A Module of TSGR, FR-440, Generic Requirements, GR-253-CORE, Issue 2, pp. 3-1 to 3-38 (Dec. 1995 with Revision 2, Jan. 1999).

Bellcore, "Synchronous Optical Network (SONET) Transport Systems: Common Generic Criteria," A Module of TSGR, FR-440, Generic Requirements, GR-253-CORE, Issue 2, pp. 6-13 to 6-18 (Dec. 1995 with Revision 2, Jan. 1999).

Bellcore, "Synchronous Optical Network (SONET) Transport Systems: Common Generic Criteria," A Module of TSGR, FR-440, Generic Requirements, GR-253-CORE- Issue 2, pp. 6-42 to 6-46 (Dec. 1995 with Revision 2, Jan. 1999).

Doshi et al., "Optical Network Design and Restoration," AT&T Technical Journal, American Telephone and Telegraph Co. New York, US, vol. 4, No. 1, pp. 58-84, Jan. 1999.

* cited by examiner

METHOD AND APPARATUS FOR SIGNALING PATH RESTORATION INFORMATION IN A MESH NETWORK

FIELD OF THE INVENTION

The present invention relates generally to techniques for restoring communication in a network after a failure in a link or node of the network, and more particularly to techniques for signaling a path restoration using pre-computed restoration paths.

BACKGROUND OF THE INVENTION

Mesh networks consist of nodes interconnected by links. Mesh networks have long been used for a variety of communications applications, and the technology for providing them has evolved over time. Today, most large-scale mesh networks used for communications applications are digital. In other words, the information being transported is encoded as a bit stream that the network nodes can access. Networks that use Synchronous Optical Network (SONET)/Synchronous Digital Hierarchy (SDH) technology are examples of digital networks. A SONET line operating at a given transmission (bit) rate may transport numerous multiplexed lower-speed SONET paths. Mesh networks can also be optical. In an optical network, each optical line carries communications on numerous wavelengths. Recent advances in optical technology are allowing the deployment of large-scale optical mesh networks.

Within a mesh network, end-to-end paths carry customer information from one customer location to another through a series of links and nodes. A node generally provides a cross-connect function, routing a path from one line to another based on a map that is stored within the node's database. A node may also multiplex a number of paths together into a single higher rate signal so that the paths can be transported efficiently through the network on a single link. At the next adjacent network node, the higher rate signal can be demultiplexed, and the constituent paths cross-connected independently, thus ensuring that each individual path is routed appropriately.

In a SONET mesh network, for example, SONET Digital Cross-Connect Systems (DCSs) perform the functions of the network nodes. SONET lines, carried on fiber extending between two adjacent DCSs, provide the network links. SONET lines also connect a customer's SONET equipment to the network. Hence, a SONET path that originates and terminates in customer equipment is transported across the SONET mesh network via a series of SONET lines that interconnect SONET DCSs, as illustrated in FIG. 1. FIG. 1 illustrates a path 110 in an exemplary SONET network 100 between two customer equipment (CE) devices 120, 130. As shown in FIG. 1, SONET Path 1 originates and is formatted in customer equipment E, enters the network at DCS A and is cross-connected (i.e., routed) at DCSs A, B and C. The path exits the network at node C and is terminated in customer equipment F. In transiting the network, SONET Path 1 is transported via four distinct SONET lines (i.e., between nodes E and A, A and B, B and C, and C and F). When the path is bidirectional, both directions of transmission would normally be routed via the same set of lines and nodes.

In a SONET network, equipment originating paths and lines add overhead bits to the customer's payload (i.e., the information an end customer is sending or receiving). The overhead has a variety of uses, including for example, performance monitoring. In formatting Path 1, customer equipment E adds SONET path overhead to the path payload as prescribed by SONET standards. When the path is subsequently terminated at customer equipment F, the path overhead is removed and processed. SONET DCSs located at intermediate points along the path would not normally read or write path overhead. Instead, they pass the path payload and overhead through to the next node transparently.

Nodes that originate and terminate SONET lines can multiplex a number of lower rate SONET paths (including both payload and overhead) together onto a single higher speed SONET line so that the paths can be transported efficiently from one node to the next on a single fiber. SONET line overhead is added to the multiplexed signal by the node that originates the line. When the line is subsequently terminated at the downstream adjacent Line Terminating node, the line overhead is removed and processed, the signal is demultiplexed, and the constituent SONET paths are cross-connected independently. As a result of the cross-connection, the constituent paths from a single incoming line may be routed and then multiplexed onto different outgoing lines.

A number of important issues in the design of large-scale mesh networks relate to traffic restoration in the event of a link or node failure. A simple approach to restoration in a mesh network is to provide complete path redundancy, such that the network includes a dedicated back-up or secondary path for each primary path of the network. FIGS. 2a and 2b illustrate a link failure and a node failure, respectively, in a portion of a bidirectional path 210. When there is a failure along the primary path 210, as illustrated in FIGS. 2a and 2b, customer traffic may then be transported on the secondary connection (not shown). Complete path redundancy is the basis for the SONET 1+1 Path Switching, illustrated in FIG. 3. With SONET path switching, the customer's traffic is bridged onto both the primary and secondary paths 310-1, 310-2 at the node 320 where the customer traffic enters the network 300, creating a duplicate signal. The primary and secondary paths 310-1, 310-2 are kept node and link disjoint and are diversely routed through the network 300, but are brought back together at the node 330 where the customer's traffic leaves the network 300. A selector function 340 located in the egress node 330 monitors input from both the primary and secondary paths 310-1, 310-2 and selects the better of the duplicated signals to forward to the customer's location 350. When there is a failure in a link or node that affects one path, the selector 340 automatically selects the signal being forwarded to the customer from the other better path. For a detailed discussion of SONET path switching applications see, for example, "SONET Dual-Fed Unidirectional Path Switch Ring (UPSR) Equipment Generic Criteria", Telcordia GR-1400-CORE Issue 2, January, 1999, incorporated by reference herein.

Unfortunately, providing dedicated redundant paths uses a large amount of restoration bandwidth, making 1+1 path selection costly and undesirable for many networks. More sophisticated algorithmic approaches to path restoration allow multiple paths to share part or all of the same restoration bandwidth whenever possible. When a primary service path fails, the nodes in the network act under software control to make cross-connects that set up a secondary path in the restoration bandwidth and route the customer's traffic onto it. If a second primary path that shares restoration bandwidth with the first path subsequently fails before the first path is repaired, the second failed path cannot be restored using that bandwidth.

Algorithmic approaches resulting in shared restoration bandwidth fall into two broad categories, namely, Distributed, Discovery-based Techniques and Techniques Using Pre-Computed Paths. Distributed, Discovery-based Techniques identify and activate restoration paths during a real-time search that is initiated by a network node after detecting the failure of a subtended link. Essentially, when a node detects a link failure, it contacts other nodes to identify spare capacity on other non-failed links that are potential candidates for alternate routing. The available spare capacity is allocated link-by-link on a first-come-first-served basis. Because it is the nodes at the ends of a failed link that initiate the search for restoration capacity, distributed discovery-based techniques are fundamentally intended for restoration from single link failures in networks where failed links can be identified by the nodes that terminate them. In SONET networks, line-terminating nodes are capable of isolating line failures; hence distributed, discovery-based techniques can be used for recovering from some failures. However, distributed, discovery-based techniques do not perform well when there is a node failure, and generally cannot be used by multiple nodes simultaneously. For a detailed discussion of such distributed discovery-based computation approaches, see, for example, W. D. Grover, "The Self-Healing Network: A Fast Distributed Restoration Technique for Networks Using Digital Cross Connect Machines," IEEE Globecom 1987, and U.S. Pat. No. 4,956,835, issued to W. D. Grover on Sep. 11, 1990, each incorporated by reference herein.

Techniques Using Pre-Computed Paths identify (or pre-compute) restoration paths in anticipation of network failures. The pre-computed restoration paths, however, are activated only when triggered by an actual failure event. The key advantage of using pre-computed restoration paths over discovery-based techniques is that, because there is no pressure to make a real-time selection of a restoration path, the restoration algorithm can take more time to optimize the use of the restoration bandwidth. Hence, for any given network failure, more paths are likely to be restored and bandwidth used more efficiently. In addition, in the event of a failure, network restorations can be completed faster since there is no need to search for restoration paths.

In techniques using pre-computation, the pre-computation may be either centralized or distributed. In a centralized computation, a central controller/database for the network stores information on the entire network topology including the amount of spare capacities of all links in the network. With this information as input, the central controller/database runs an algorithm with the objective of computing restoration paths for each primary service path in the network. As output, the controller creates a routing table that specifies which cross-connects (or equivalent information) are to be made at network nodes to restore customer service when there is a failure in the network. The routing table may be stored within the controller/database, or it may be partitioned into multiple routing tables each including only the cross-connects to be made at a particular node. In the latter case, the partitioned tables are then downloaded to their respective network nodes where they are stored until needed to effect a restoration.

Different strategies are required for activating/controlling restoration, depending on whether the routing table is stored in the controller or in the network nodes. In the former case, the network node or nodes that detect the failure notify the controller. On receiving this information, the controller accesses its routing table and, based on the information it receives from the detecting nodes, issues cross-connect commands to the network nodes that must take action to restore service. This method is called centralized computation with centralized activation/control of restoration. In the latter case, when routing tables are stored locally in each network node, the nodes that detect a failure notify the nodes that must take action to restore service directly, or the notification is relayed from node to node in the network. On receiving a failure notification, each node accesses its local routing table and, based on information received in the notification, executes the appropriate cross-connects needed locally to restore service. This method is called centralized computation with distributed activation/control of restoration. For a more detailed discussion of centralized pre-computation techniques, see, for example, J. Anderson, B. T. Doshi, S. Dravida and P. Harshavardhana, "Fast Restoration of ATM Networks," JSAC 1991, incorporated by reference herein.

In a distributed pre-computation, the computation of the restoration routes is distributed among the nodes in the network, each of which has information concerning capacities of the links it terminates. During the computation, each node creates a routing table with a local view of the restoration paths to be used in the event of path failures. The routing table is stored within the respective network node. Subsequently, when there is a failure in the network, the restoration actions of the nodes are similar to those described above for distributed control/activation of restoration. However, because the computation of restoration paths is distributed among the nodes of the network, this method is referred to as distributed computation with distributed control/activation of restoration.

U.S. patent application Ser. No. 08/960,462, filed Oct. 29, 1997, entitled "Distributed Pre-computation of Signal Paths In An Optical Network," incorporated by reference herein, discloses improved network restoration techniques, referred to hereinafter as the "Pre-computed Restoration Techniques." The disclosed Pre-computed Restoration Techniques utilize distributed pre-computation to provide path restoration in large-scale optical mesh networks after a link, span or node failure while, at the same time, allowing multiple paths to share restoration bandwidth. Each restoration path is pre-computed to be physically disjoint and diversely routed from the associated primary path, except for the end nodes providing access and egress to the network. The Pre-computed Restoration Techniques allow a single restoration path to protect a given primary service path. Hence, no matter which node or link fault causes a path failure, the path is always restored in the same way. Once a failure is detected in one or more primary service paths, the pre-computed restoration paths can be activated in a real-time manner.

The disclosed Pre-Computed Restoration Techniques provide methods for distributed pre-computation of end-to-end restoration paths and allow distributed real-time restoration in optical mesh networks. They can also be applied without modification to pre-computing end-to-end restoration paths for SONET/SDH mesh networks. However, they do not address the signaling that the network nodes must use after a failure to activate and control a distributed real-time restoration in either an optical or a SONET/SDH network when the Pre-Computed Restoration Techniques have been used to compute the restoration paths.

Signaling methods can be designed to use a signaling network having links and nodes that are physically separate from the links and nodes of the mesh network, except where a signaling network link interfaces physically to a mesh network node. The physical separation limits the impact of mesh network failures on the ability to signal when a mesh network restoration is required. Such physically separate networks are often used for restoration signaling when both pre-computation and activation/control are centralized. Such networks are often fully duplexed to provide high reliability.

A separate, reliable signaling network could also be used for node-to-node communication in a distributed restoration.

However, the operational complexity of constructing, provisioning and maintaining a separate signaling network makes using a separate network undesirable for many restoration applications. For such applications, it is preferable to transport signaling through the mesh network itself, provided it can be done reliably and cost-effectively. Reliable transport means that the specific links and nodes of the mesh that are used for restoration signaling must be available when needed. In other words, they cannot be affected by the mesh network failure that necessitated restoration signaling in the first place. Within the mesh, reliability for signaling paths can be provided with complete path redundancy. However, as noted earlier, providing dedicated redundant paths, whether for reliability or restoration, uses a large amount of bandwidth, which tends to be costly. Hence, a need exists for a method that allows sharing or reuse of signaling bandwidth, while at the same time provides reliability for signaling.

An additional concern in using the mesh network itself for signaling is that, within existing networks, for example, in SONET networks that are already widely deployed, there may be heterogeneous network elements, such as network elements with diverse monitoring, signaling and cross-connect functionality and databases. For example, the network may include older generation network elements of a given manufacturer, or network elements provided by a number of manufacturers, that each provide varying restoration capabilities, if any. A need therefore exists for a signaling method and apparatus that permits the restoration of a failed primary service path, even in the presence of such non-conforming network elements.

SUMMARY OF THE DISCLOSURE

Generally, a method and apparatus are disclosed for monitoring for primary path failures and signaling path restorations using pre-computed restoration paths following the failure of a link or node within in any mesh network, such as a SONET mesh network, in which the restoration nodes can (i) originate and terminate paths; and (ii) read restoration-related information from and write restoration-related information into path overhead or payload as described in this document. Pre-computed restoration paths compatible with the disclosed methodology can be obtained, for example, in accordance with the Pre-computed Restoration Techniques described earlier. A network that implements the present invention will be referred to as a "restorable network." Each of the conforming nodes in a restorable network is referred to as a restoration node and has the necessary monitoring, signaling and cross-connect functionality and databases to participate actively in a real time restoration in accordance with the present invention. In addition, non-conforming network elements, such as those without the necessary functionality and databases, can be positioned in between the restoration nodes and do not prevent restoration in accordance with the present invention.

Within a restorable SONET network, a primary path is assumed to be coincident with a SONET path. However, end-to-end SONET paths can extend beyond the boundaries of a restorable network, for example, to other SONET networks operated by different administrations (where restoration techniques may or may not be implemented), or to customer equipment that is not considered part of the network. A SONET path can fail as a result of a node or link failure occurring either inside or outside the boundaries of the restorable network. However, the present invention triggers path restoration signaling only when a fault causing a path failure occurs within the identified boundaries of the restorable network. Such failures are referred to as "in-network" faults. Hence, according to one aspect of the disclosed invention, a mechanism is provided for monitoring each path traversing the restorable network for a path failure and, when such a failure is identified, determining whether or not the failure is caused by a fault occurring inside or outside of the restorable network. In the disclosed invention, the nodes where a SONET path enters and exits the restorable network, referred to herein as "end nodes," monitor for path failures and subsequently trigger restoration signaling when required. End nodes for each service path are identified when the service path is initially provisioned.

In an illustrative implementation, the determination of whether a fault occurs inside or outside of a network is performed in accordance with the well-known ANSI Tandem Connection standard. Thus, the present invention is able to operate in an environment where the path terminations are located outside the restorable network, e.g., in a multi-network environment or where customer path terminating equipment is not part of the restorable network, and to trigger restoration signaling only when the fault causing a path failure is located within the restorable network.

Under the Pre-computed Restoration Techniques, multiple primary service paths potentially share all or some of the same restoration bandwidth. Because two paths cannot be provisioned in the same bandwidth at the same time, restoration paths cannot be provisioned before a failure occurs and must be set up after an "in-network" failure has been detected. Thus, a rapid, robust and reliable signaling method is required to transmit information about the path failure from the end nodes that detect the failure to the restoration nodes that must perform cross-connects to restore service. The present invention provides for node-to-node signaling to enable distributed restoration of the network. The node-to-node signaling of the present invention aims to enable sub-second restoration in large carrier-grade networks (given reasonable assumptions about the cross-connect rate of the restoration nodes and the numbers of cross-connect commands that must be processed by each node during a typical restoration), use bandwidth efficiently and operate reliably, even in the presence of non-conforming SONET network elements located between restoration nodes.

The present invention uses a multiple replaceable paths architecture for node-to-node signaling. With the disclosed multiple replaceable paths architecture, two adjacent restoration nodes create SONET paths for restoration signaling in the restoration (or "spare") bandwidth that lies between them. The restoration nodes originate and terminate these SONET paths. These paths extend between the restoration nodes and pass transparently through any intervening non-conforming SONET network elements because non-conforming network elements do not terminate the paths. Subsequently, when an end node of a primary path detects an "in-network" path failure, the end node formulates a signaling message that identifies the failed path uniquely and requests set-up of the restoration path. The restoration signaling message is thereafter relayed from one restoration node to another, for example, using the overhead or payload of the signaling paths that occupy the exact same bandwidth that will subsequently be used by the restoration path.

When the pre-computed restoration path passes through at least three (3) restoration nodes, including the end nodes, several signaling paths will be used in tandem to signal a restoration. In this case, the intermediate restoration nodes make signaling routing decisions based on information from the pre-computation which they have stored in their routing tables. Once a signaling message is transmitted to an adjacent node using the overhead or payload of a particular signaling path, the node that transmitted the message makes a cross-connect that replaces that signaling path with a segment of the restoration path whose set-up was requested in the transmitted signaling message. When the signaling message has passed through all intermediate nodes on the restoration path and reaches the far-end end node, and the far-end node verifies end-to-end connectivity and makes its final cross-connect, the failed path is restored.

The invention provides the following benefits: Because a signaling path follows the same route and occupies the same bandwidth as (a segment of) a pre-computed restoration path, if a pre-computed restoration path is available, the paths for signaling its set-up are also available. Hence, the method is reliable. In addition, because signaling messages are carried in the restoration bandwidth, no additional bandwidth needs to be dedicated for signaling. Hence, the method uses bandwidth efficiently. Also, because the signaling paths extend between the restoration nodes and pass transparently through any intervening non-conforming SONET network elements, signaling messages transported in those paths also pass transparently through intervening non-conforming network elements. Hence, the signaling method will operate even in the presence of such non-conforming network elements.

A more complete understanding of the present invention, as well as further features and advantages of the present invention, will be obtained by reference to the following detailed description and drawings.

DETAILED DESCRIPTION

Figure 1:
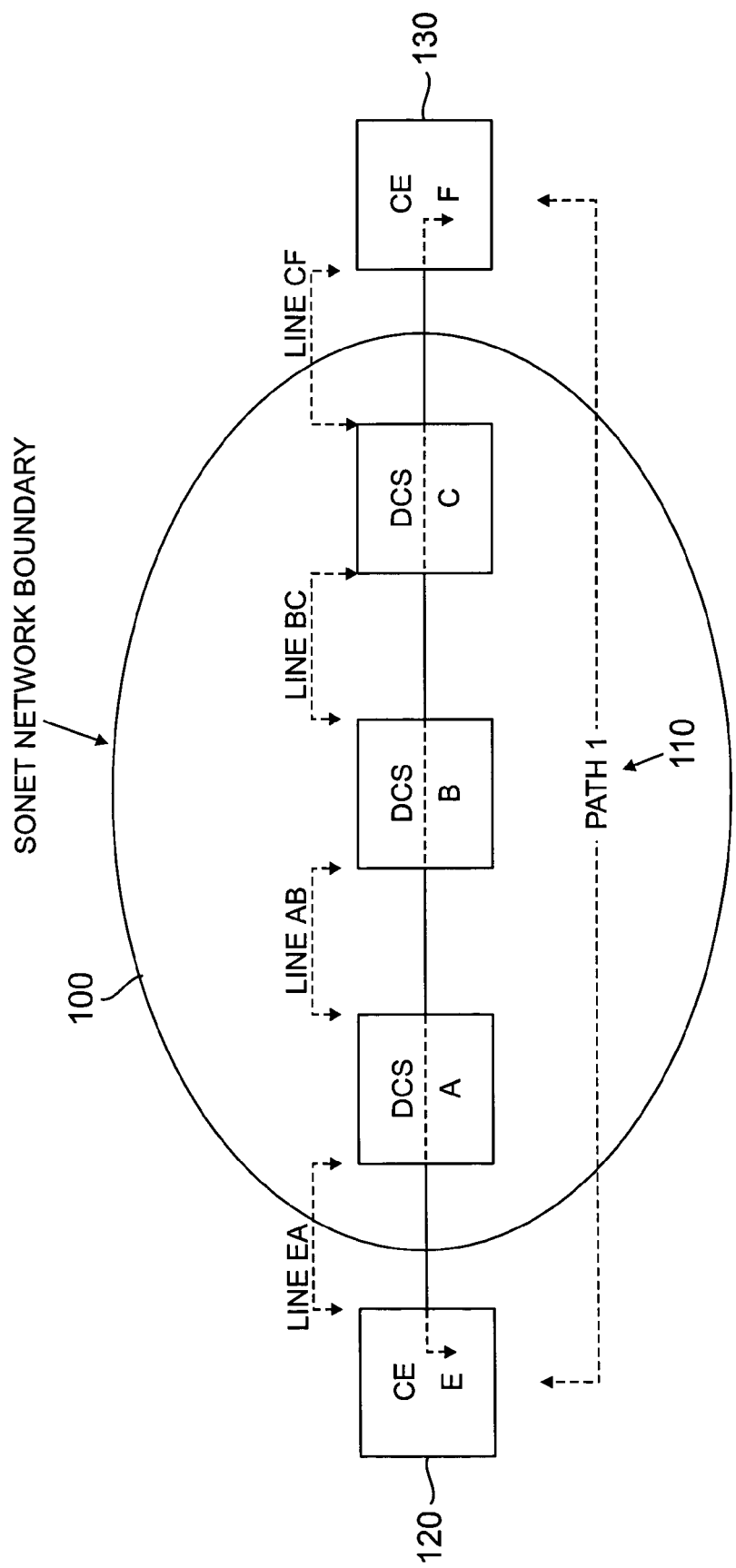
FIG. 1 illustrates a SONET path between two client equipment (CE) devices in an exemplary network where the present invention can operate.
Figure 2A:
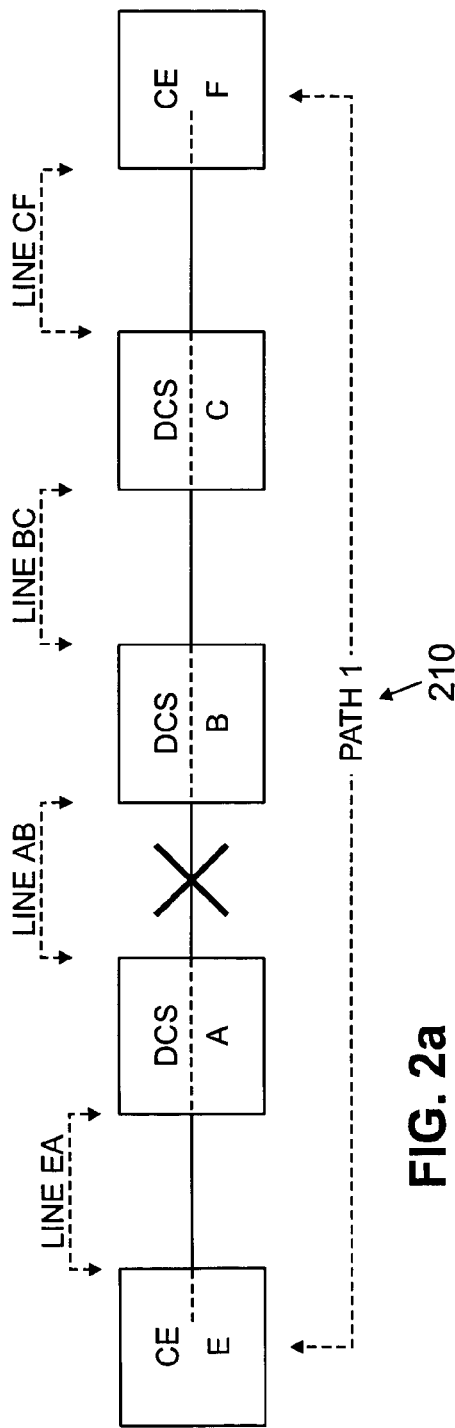
FIG. 2a shows a link failure in a portion of a bidirectional path.
Figure 2B:
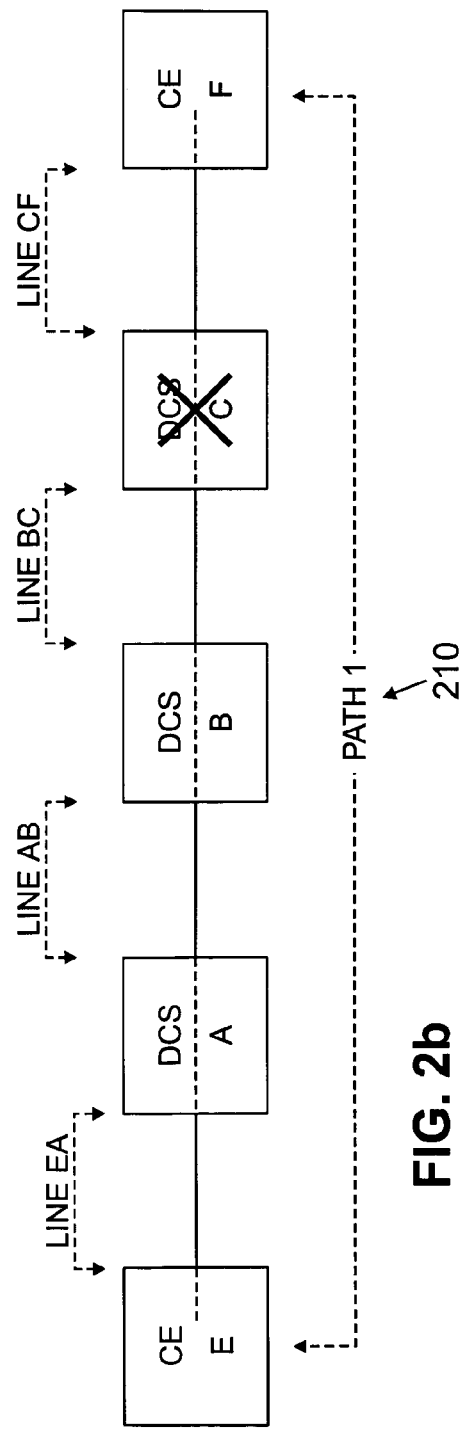
FIG. 2b shows a node failure in a portion of a bidirectional path.
Figure 3:
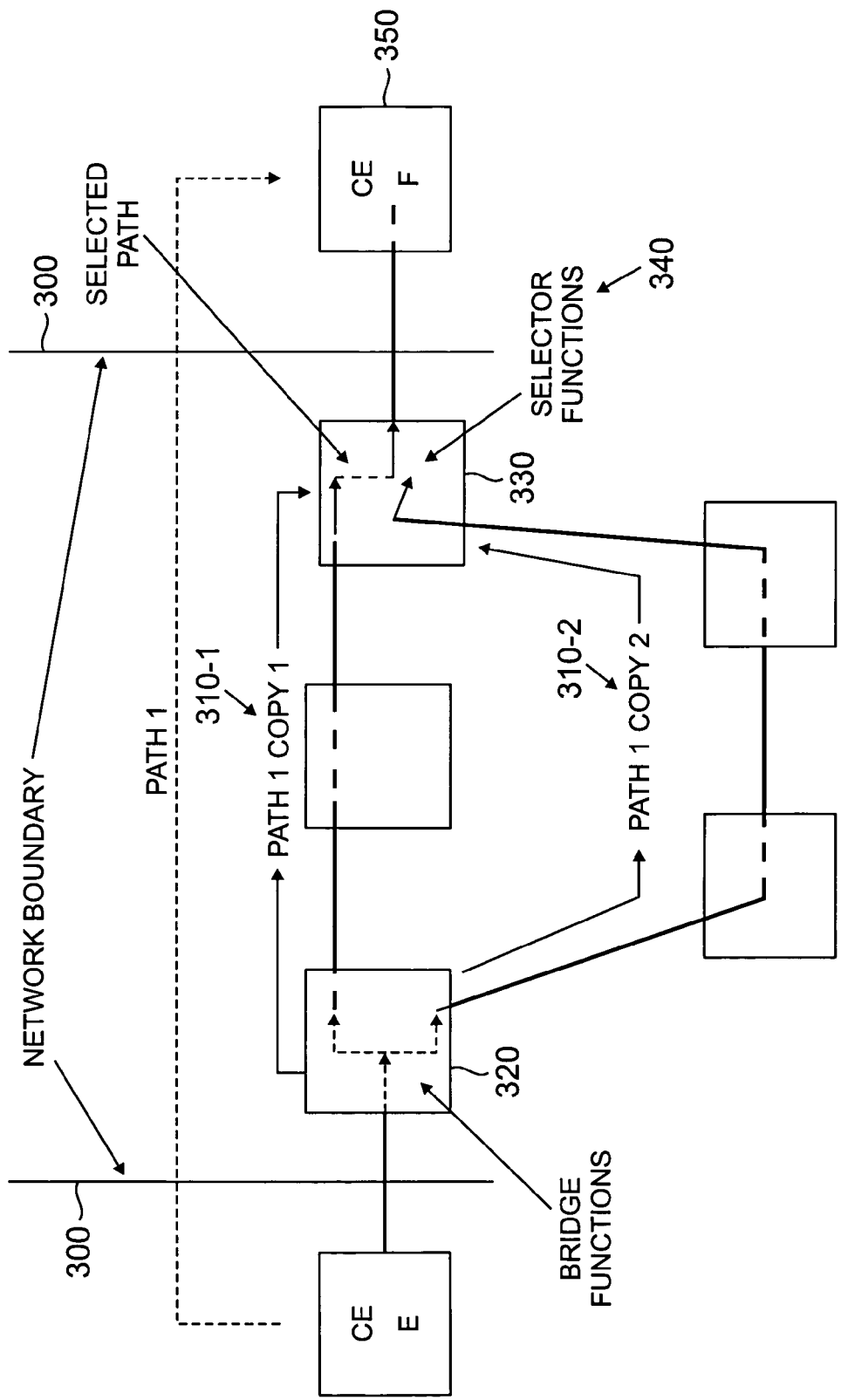
FIG. 3 illustrates 1+1 Path Protection in a SONET network.
Figure 4:
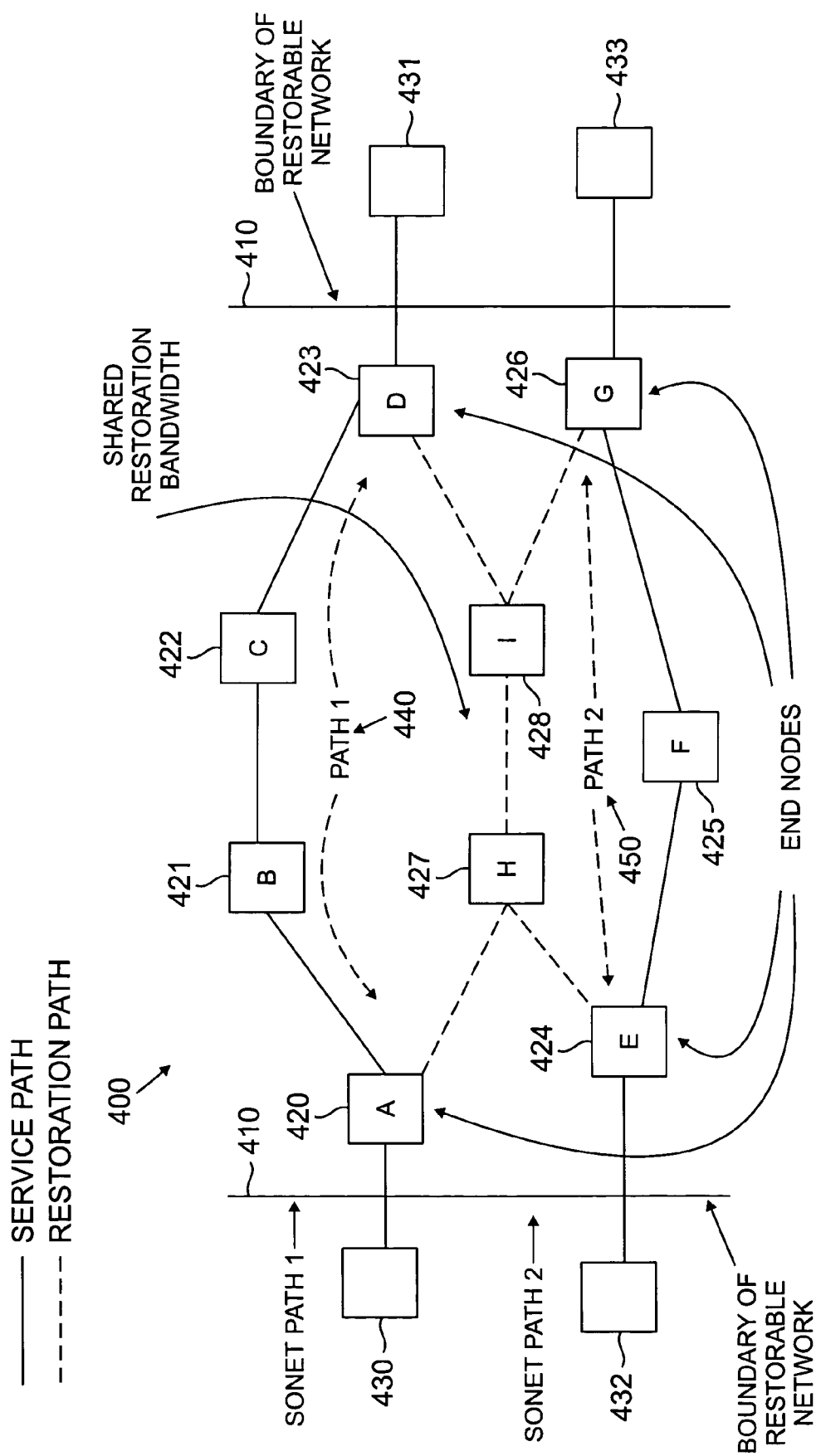
FIG. 4 illustrates an exemplary SONET network in which the present invention can operate.

FIG. 4 illustrates an exemplary network 400, such as a SONET network, in which the present invention can operate. Generally, the network 400 includes at least three conforming nodes, such as nodes A, B and D, each referred to as restoration nodes, and has well-defined end-to-end paths, such as Path 1 and Path 2. It is noted that each of the nodes shown in FIG. 4 are conforming nodes. In addition, non-conforming network elements (not shown), such as those without the necessary functionality and databases, can be positioned in between the restoration nodes and do not prevent restoration in accordance with the present invention. The present invention may be employed in any mesh network in which the restoration nodes can (i) originate and terminate paths, and (ii) read restoration-related information from and write restoration-related information into path overhead or payload as described in this document.

Generally, when a node does not terminate a path in a SONET network, the transmitted information (payload and overhead) is passed transparently through the node. The restoration nodes of the present invention can access the path overhead as it passes through a node. In addition to the illustrative SONET networks, this method would be applicable, for example, in networks with Synchronous Digital Hierarchy (SDH) technology, or potentially in optical networks with paths having associated digital information, such as a digital wave-wrapper, since wave-wrapper technology encloses each optical wavelength/path in a digital "wrapper" that can be accessed by intermediate nodes along the path.

The present invention provides monitoring and signaling capabilities for the implementation of real-time distributed path restoration in the exemplary SONET network 400 using pre-computed restoration paths. The pre-computed restoration paths can be obtained, for example, in accordance with the Pre-computed Restoration Techniques referenced above. According to one feature of the present invention, pre-computed restoration paths are activated in response to a detected fault on a primary service path and customer service is thereby restored when there is an in-network fault. In the multiple network environment of the present invention, it is important to determine if a fault occurs within the restorable portion of the network 400, referred to as an "in-network" fault. Otherwise, it is possible to activate cross-connects that will not result in restoration of the failed service because the fault causing the problem is outside the restorable network. Later, if another path that shares restoration bandwidth with the first failed path also fails due to an "in-network" fault, it will not be possible to restore it because its restoration bandwidth has already been claimed for the unsuccessful restoration of the first path.

Thus, according to another feature of the present invention, a mechanism is provided for determining whether or not a fault occurs inside or outside of a restorable network, and for activating path restoration signaling only when the fault that caused path failure is inside the restorable network. In one implementation, discussed further below, the determination of whether a fault occurs inside or outside of a network is performed in accordance with the ANSI Tandem Connection standard, described in "Synchronous Optical Network (SONET)—Tandem Connection Maintenance," ANSI T1.105.05, incorporated by reference herein.

Generally, in a SONET network, a network fault is identified when a network node detects Loss Of Signal (LOS) on an incoming SONET line. LOS may be due to a failure of the line itself or of the node at the other end of the line. The detecting node transmits a standard SONET maintenance signal, Alarm Indication Signal-Path (AIS-P), away from the failure in all affected paths carried on that line. When the failure is bidirectional, the AIS-P signal propagates in both directions from the nodes adjacent to the failure to the terminations of the respective SONET paths. In a SONET network, the AIS-P is an all ones signal transmitted in the path payload, path overhead and the path pointers. To detect path failure, it is generally sufficient to monitor the pointers alone.

Under the ANSI Tandem Connection Maintenance standard, a restorable in-network fault is differentiated from a general network fault by the end-nodes along a given path. When an end node detects a failure of a SONET path entering the restorable network from the outside, that end node re-establishes the SONET path pointers so that the Path Overhead can be accessed. It then places a flag in the path overhead to indicate that a failure was detected on the path as it entered the network. With the path pointers thus re-established, out-of-network faults become transparent to all the subsequent nodes along a given path. Subsequent nodes see valid pointers and treat the SONET paths as if they were carrying valid user traffic, instead of the characteristic all ones signal of AIS-P. Hence, these subsequent nodes do not attempt to initiate path restoration. However, the presence of the flag in the path overhead triggers the exit end node (the far-end node where the path leaves the network) to re-insert AIS-P on the outbound path, thus assuring that downstream SONET Path Terminating Equipment (PTE) lying outside the restorable network knows about the original failure. On the other hand, when an exit end node finds AIS-P on an out-bound path, as indicated by an invalid path pointer, then the fault causing the path failure occurred within the restorable network. The node acts on this information and subsequently triggers restoration signaling.

Another aspect of the present invention addresses the required node-to-node signaling to enable distributed restoration of the exemplary network 400. Generally, the node-to-node signaling aims to enable sub-second restoration in large carrier-grade networks, use bandwidth efficiently, operate reliably and also be compatible with non-conforming network elements. As discussed further below, within the signaling architecture of the present invention, one or both end nodes of a failed path within the restorable network formulate a signaling message requesting restoration. The restoration-signaling message is thereafter relayed from one restoration node to another in the overhead or payload of signaling paths that occupy the exact same bandwidth that is subsequently used by the restoration path. Restoration signaling messages are passed through non-conforming nodes transparently since those nodes do not terminate the signaling paths. As discussed further below, various embodiments of the present invention provide for restoration path set-up, path removal, and handling of misconnections and priorities.

FIG. 4 shows an exemplary SONET network 400 in which the restoration techniques of the present invention may be implemented. As shown in FIG. 4, the SONET network 400 includes a boundary 410 that separates the SONET network 400 into a restorable portion and a non-restorable portion. The SONET network 400 includes a number of nodes 420-428 in the restorable portion of the network 400 and a number of nodes 430-433 in the non-restorable portion of the network 400. Each of the nodes 420-428 in the restorable portion of the network 400, referred to hereinafter as restoration nodes 420-428, may be embodied as a SONET Digital Cross-Connect System (DCS), discussed further below in conjunction with FIG. 5, as modified herein to provide the features and functions of the present invention. Each of the restoration nodes 420-428 have the necessary monitoring, signaling and cross-connect functionality and databases to participate actively in real time restoration in accordance with the present invention. For a more detailed discussion of SONET DCSs and the structure of SONET signals, including line and path overhead, as well as generic monitoring of SONET signals, see, for example, Generic Criteria for SONET Digital Cross-Connect Systems (DCS), Telcordia GR-2996-CORE, Issue 1, January, 1996; and Synchronous Optical Network (SONET) Transport Systems: Common Generic Criteria, Telcordia GR-253-CORE, Issue 2, Revision 2, 1999, each incorporated by reference herein.

It is noted that there may be additional non-conforming network elements (not shown) located between the restoration nodes 420-428. The non-conforming network elements may be, for example, older generation network elements of a given manufacturer, or network elements provided by a number of manufacturers. The non-conforming network elements do not provide the necessary monitoring, signaling and cross-connect functionality and databases to participate actively in real time restoration in accordance with the present invention. However, according to a feature of the present invention, discussed further below, the restoration techniques of the present invention work even in the presence of such non-conforming network elements.

It is again noted that a given path can traverse a plurality of networks in the multiple network environment of the present invention. Thus, a fault resulting in failure of a given path could occur in any of the networks. The restoration techniques of the present invention, however, enable service to be restored only if the fault causing path failure occurs within the boundary 410 of the "restorable network" and prevent unnecessary signaling or cross-connecting when the fault is outside the network. Thus, as previously indicated, the present invention utilizes a mechanism for detecting path failures and activating restoration that distinguishes a failure that occurs within the restorable network from a failure that occurs outside the restorable network.

FIG. 4 illustrates two disjoint paths 440, 450. Path 440 enters the boundary of the restorable network at node A and passes through nodes B and C before exiting the network at node D. Nodes A and D are referred to as end nodes, since they mark the ends of the path within the restorable network. Nodes B and C are called intermediate nodes. Similarly, Path 450 enters the restorable network at end node E, passes through intermediate node F and exits at end node G. Within the restorable network, Path 440 and Path 450 are disjoint and diversely routed. Hence, they will not fail simultaneously unless there are multiple faults in the network. Under these conditions, the pre-computation algorithm of the present invention allows Path 440 and Path 450 to share all or part of the same restoration bandwidth, with a view that if both primary paths fail simultaneously, only one can be guaranteed to be restored. In this example, the pre-computed restoration path for Path 440 extends through nodes A, H, I and D. The pre-computed restoration path for Path 450 extends through E, H, I and G. The restoration bandwidth shared by these paths is between nodes H and I.

The sharing of restoration bandwidth allows network capacity to be used more efficiently and cost-effectively than with rings or 1+1 path protection schemes. However, when restoration bandwidth is shared, the restoration path cannot be provisioned before a failure occurs. Thus, the restoration path must be set up (i.e., the appropriate cross-connects must be made at nodes along the restoration path) after the failure has occurred. Thus, a rapid, robust and reliable signaling architecture is required to convey information about the fault from the place where the fault occurred and was detected to the nodes that must take action to restore service.

It is noted that an end-to-end path between Path Terminating Equipments (PTEs) may cross one or more networks, and one or more of these networks may be restorable. As used herein, a restorable path extends from end node to end node within a restorable network. Hence, a part/segment of the overall end-to-end path traversing one of the restorable networks may be restorable.

The nodes 420-428 and 430-433 of the illustrative network 400 are interconnected by optical fiber connections. (This connection may be direct from restoration node to restoration node, or via intervening, non-conforming network elements that do not provide the restoration capabilities discussed in this invention.) It should be noted that the network 400 of FIG. 4 is simplified for purposes of illustration. The invention is well suited for use in large-scale regional, national and international networks which may include many sub-networks, each having hundreds of nodes. In a SONET network, for example, one or more of the sub-networks may be associated with each local exchange carrier (LEC) and inter-exchange carrier (IXC) of the network.

Figure 5:
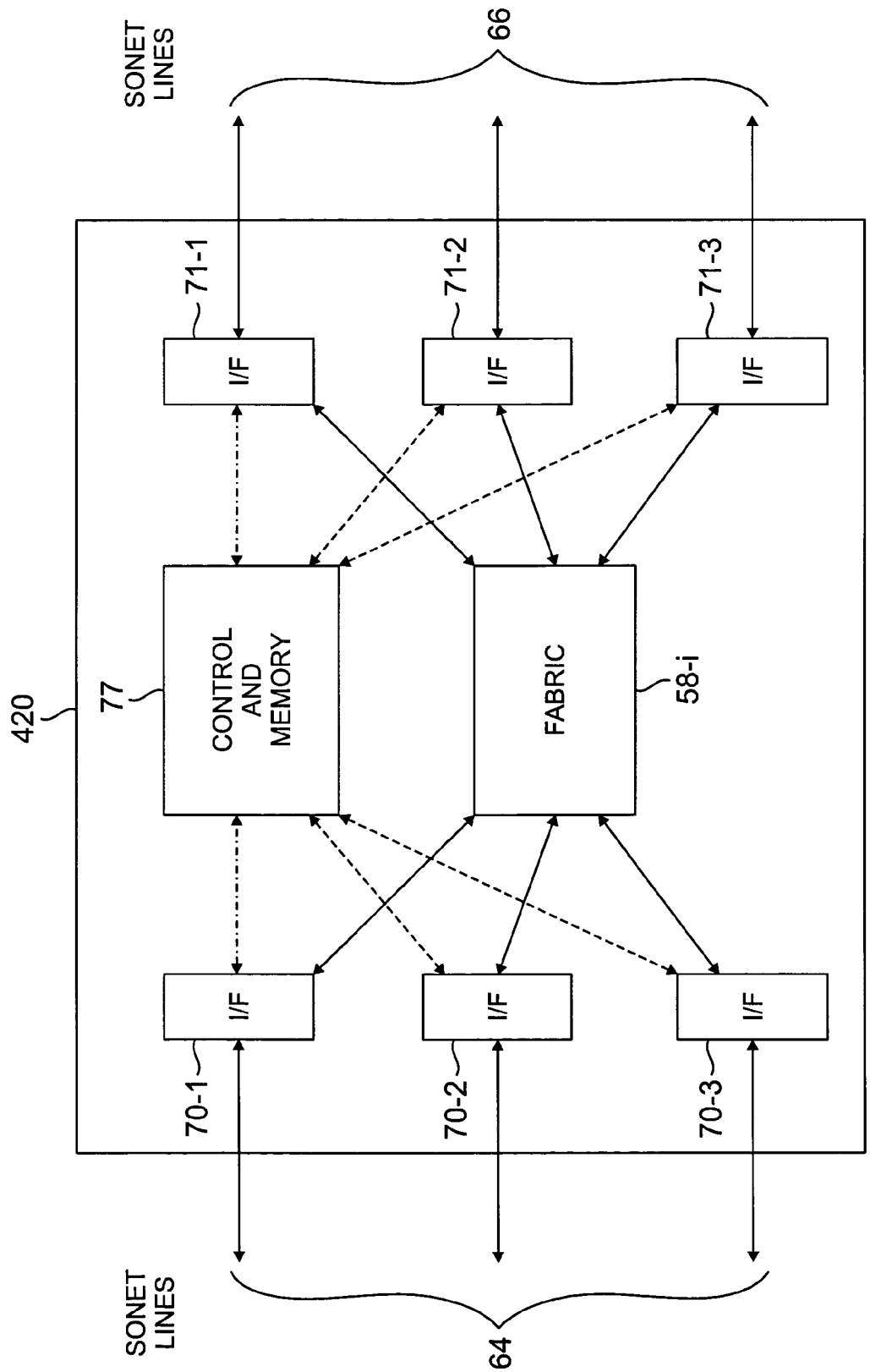
FIG. 5 illustrates one of the nodes from the network of FIG. 4.

FIG. 5 shows one of the restoration nodes, such as node 420, of network 400 in greater detail. The node 420 includes a cross-connect fabric 58-*i*, and is connected to other nodes in the network 400 by means of bidirectional links 64 and 66 and interfaces 70-1, 70-2 70-3, 72-1, 72-2, and 72-3. The node 420 supplies SONET signals to the other nodes in the network 400 via the bidirectional links 64 and 66. The interfaces 70-1, 70-2,70-3, 72-1, 72-2, and 72-3 provide optical/electrical conversion for signals on bidirectional links 64 and 66. The interfaces 70-1, 70-2, 70-3, 72-1, 72-2, and 72-3 also provide SONET line terminating functions, SONET path terminating functions for signaling paths, and read/write access to SONET path overhead or payload for signaling, service and restoration paths, as described later. The node 420 also includes a control and memory function 77 that may be provided on one central processor or multiple distributed processors in the node. A map of the current state of the fabric is included in the control and memory function 77. The control and memory function 77 also contains routing tables that specify map or cross-connection changes needed to implement the pre-computed restoration paths. These same tables are also accessed to route signaling messages, as described later. The node 420 has been simplified for purposes of illustration, and as noted above may include a substantially larger number of input and output links, as required for a given application.

Real Time Restoration

The present invention preferably utilizes the Pre-computed Restoration Techniques referenced above to pre-compute a restoration path, from an end node, such as node 420, to an end node, such as node 423, for each primary path, such as path 440, that traverses the restorable network. The Pre-computed Restoration Techniques are also described in B. T. Doshi et al., "Optical Network Design and Restoration," Bell Labs Technical Journal (April-June 1999), incorporated by reference herein. With the Pre-computed Restoration Techniques, a single restoration path is pre-computed for each primary service path in the network. The restoration path passes through both end nodes of the associated primary service path, but is otherwise disjoint and diversely routed from the primary service path. Hence, no single failure, other than a failure of an end node, can cause both the primary path and the pre-computed restoration path to fail simultaneously. In addition, no matter what the cause of a path failure (e.g., cable cut, node failure, equipment failure) when a given primary path fails, it is always restored using the same restoration path. The present invention provides the real-time capability to determine which primary paths have failed so that they can be restored.

Information describing pre-computed restoration paths for every primary service path in the network is stored in a database or databases until it is needed to restore service after an "in-network" failure. As noted earlier, this information can be stored either in a central controller/database for the network, or it can be partitioned and stored locally in each node. In the latter case, each node has a database containing a local view of the restoration paths. In either case, when there is a subsequent node or link failure in the network, the paths affected by the failure must be identified, and the associated restoration paths must be activated. The method for identifying the failed paths and activating the restoration paths depends on whether restoration path information is stored in a central controller/database or stored locally in each node. The present invention is applicable when data is stored locally in each network node. The process is referred to as distributed activation/control of restoration. Hence, to implement the present invention, data from the pre-computation must be previously stored in the restoration nodes 420-428. The data stored in the restoration nodes is the same regardless of whether the pre-computation is done centrally or distributed among the nodes.

One aspect of the disclosed invention is that the restoration nodes 420-428 will incorporate signaling functionality enabling node-to-node communication about failures. Because the end nodes, such as nodes 420 and 423, are on both the primary and restoration paths, the end nodes have been selected to monitor for primary service path failures and to initiate node-to-node restoration signaling when necessary. Another aspect of the disclosed invention is that restoration signaling will follow the route of the restoration path. This approach to restoration signaling is called restoration path signaling.

The choice of signaling along the restoration path route is significant. Because the restoration path is disjoint and routed diversely from the primary service path, with the exception of the end nodes, no single failure (except end-node failure) can affect both. Hence, if restoration signaling follows the route of the pre-computed restoration path from the end-nodes through the network, the signaling will get through to the nodes that must perform cross-connects to restore service, unless there are multiple simultaneous network failures. Conversely, if bandwidth along the restoration route is not available, e.g., due to a second network failure, service could not be restored, even if another signaling method was used and restoration messages reached the appropriate nodes via another route.

Real-time restoration path signaling requires (i) capabilities at the end nodes to monitor and detect failures of the primary path and to initiate restoration signaling; (ii) capabilities in intermediate nodes to receive, process and forward signaling information on to the next node involved in the restoration; (iii) available paths along the restoration route to transport signaling; (iv) capabilities at end nodes to verify that restoration connections have been made properly, and to initiate backout signaling in the event of misconnections or other anomalies; and (v) local storage (within each node) of information/data from the pre-computation needed to perform the above functions.

Restorable Network Boundary

Out of Network Failures Versus in Network Failures

Figure 6:
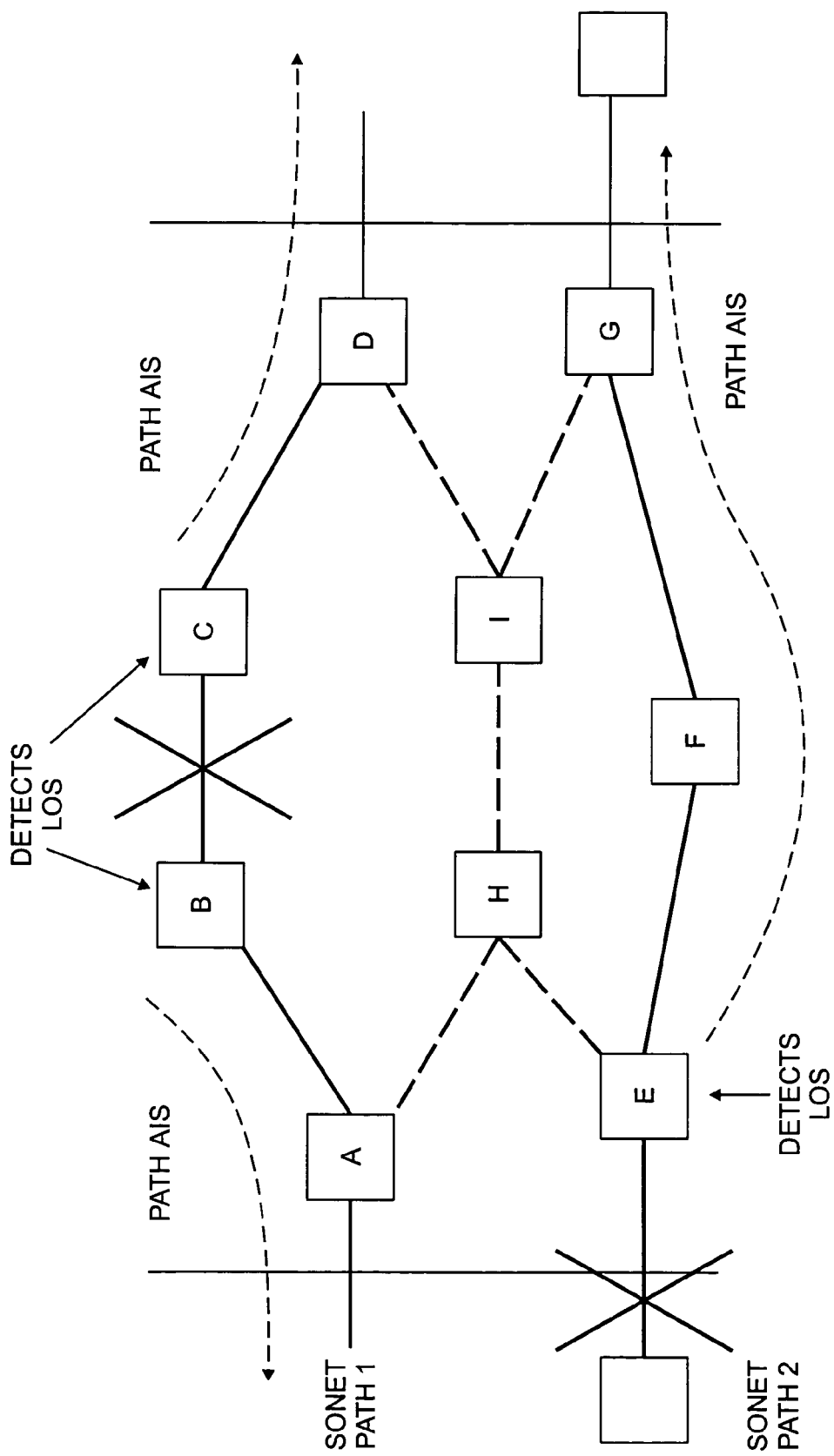
FIG. 6 illustrates the issuance of maintenance signals by network elements in response to a failure that affect both directions of a transmission along a given path.

FIG. 6 illustrates how the SONET network elements 420-428 issue maintenance signals in response to failures that affect both directions of transmission along given paths 1, 2. In this example, path 1 is carried on a SONET line 610 extending between nodes B and C. As illustrated in FIG. 6, the line 610 fails (e.g., due to a cable cut). Hence, all paths carried on the line 610 fail as well. Nodes B and C detect a Loss of Signal (LOS) on the line 610 and transmit a standard maintenance signal, Alarm Indication Signal-Path (AIS-P), outward in all affected SONET paths, including Path 1. The AIS-P signal propagates in both directions to the terminations of the SONET paths. The AIS-P is an all-ones signal that over-writes the path pointers, path overhead and path payload. Path AIS would normally be detected by monitoring for an all-ones pointer.

The AIS-P traverses the length of the SONET path from the node adjacent to the failure, through the end node and beyond to SONET Path Terminating Equipment. Thus, AIS-P could potentially be used as an indicator of primary path failure, and hence used to trigger restoration. However, there is a problem with using AIS-P alone for this purpose. A node that detects an incoming AIS-P cannot distinguish between a SONET path failure that occurs in the restorable network, and one that occurs outside the restorable network, as illustrated in FIG. 6. In the example shown in FIG. 6, path 1 has an in-network failure and path 2 has an out-of-network failure. From the standpoint of end nodes D and G, however, these failures appear the same. The restoration techniques of the present invention, however, should be triggered only for in-network failures. As previously indicated, the illustrative embodiment determines whether a given failure is an in-network or out-of-network failure using the functionality specified in the ANSI Tandem Connection Maintenance standard.

Out of Network Signal Degrade Versus in Network Signal Degrade

If in addition to hard failure conditions (also called Signal Fail conditions), Signal Degrade (which is characterized by excessive errors) is also to be used as a criteria for activating restoration, the Tandem Connection Maintenance Standard also provides functionality for determining the number of bit errors per unit of time that occurred within the restorable network versus outside the restorable network. Data on the number of in-network errors can be used as the basis for in-network signal degrade calculations, as would be apparent to a person of ordinary skill in the art.

Restoration Node Capabilities for Identifying Failed Paths

The capabilities referenced above for identifying in- and out-of-network signal failures and degrades consist of a subset of the capabilities described in the Tandem Connection Maintenance Standard, ANSI T1.105.05-1994, incorporated by reference herein. To provide these functions, the restoration nodes 420-428 must have read and write access to the H1, H2 and H3 Path Pointers, the B3 parity byte, and the Z5 SONET Tandem Connection Overhead byte.

The restoration nodes 420-428 must also provide new provisioning capabilities that allow the user to identify the two end nodes where a SONET path enters/exits the restorable network. The provisioning of the path end nodes is necessary to clearly delineate the part of the SONET path that is contained within the restorable network and to activate the special path monitoring capabilities described above. These same end nodes must also initiate restoration signaling when they detect an in-network path failure.

Modularity of Restoration

The present invention can be implemented in networks having various cross-connect rate signals, such as STS-1, STS-3c, STS-12c and STS-48c rate signals. Networks where most paths are STS-48cs or STS-12cs will generally restore faster than a network of equal size where the paths are STS-3cs or STS-1s. This happens because to restore an STS-48c path takes about as many cross-connects as to restore an STS-1 path, but restoring the STS-48c path restores 48 times the bandwidth. Thus, to protect lower rate paths and speed up the restoration process, the present invention provides capabilities to group STS-1 and STS-3c rate paths that have the same end nodes and traverse the same route through the restorable network into larger restoration "bundles." A "bundle" would be treated as a single STS-12c or STS-48c rate path for the purpose of pre-computation. During a real-time restoration, the bundle would be restored as a unit.

In addition, the monitoring techniques described above would now be applied to the constituent paths within the bundles. The restoration can thus be activated based on the failure or degrade of one, some, or all of the constituent signals. It is noted that the ANSI Tandem Connection capabilities allow for bundling of paths across a network. A Tandem Connection fault is declared if any one of the constituent paths has a fault.

Real-Time Restoration Activation Signaling

As previously indicated, when multiple primary service paths share the same restoration bandwidth, restoration paths cannot be provisioned before a failure occurs. The paths must be set up (i.e., the appropriate cross-connects must be made at nodes along the path) after the failure has been detected, necessitating a rapid, robust and reliable signaling architecture. However, there are currently no signaling standards to enable the distributed activation and set-up of restoration paths in SONET-based mesh networks.

The signaling method of the present invention enables sub-second restoration of the network from a single failure, given reasonable assumptions about the size of the network (large, carrier-grade network), the number of cross-connects expected at a typical node during restoration, and the rate at which cross-connects can be executed at a node. The signaling method of the present invention is compatible with non-conforming network elements. In addition, the signaling method of the present invention uses bandwidth efficiently because it does not require additional bandwidth beyond that which is required for the restoration paths. Finally, the signaling method is reliable.

Signaling Architecture—Multiple Replaceable Paths

As previously indicated, the present invention utilizes a multiple replaceable paths approach, wherein a signaling message for restoring a failed path is formulated by the end node(s) and relayed from restoration node to restoration node in bandwidth that is assigned to the restoration path by the pre-computation. The signaling message is routed exactly along the pre-computed restoration path. For example, if the pre-computation indicates that the restoration path for a given primary path will use a given SONET line and be the second path multiplexed on that line, then the signaling message to restore that path must be routed on that line via the second signaling path multiplexed within the line. As previously indicated, however, the restoration path is not yet set up (the cross-connects have not been made), so the restoration path itself cannot be used to transport signaling.

Figure 7:
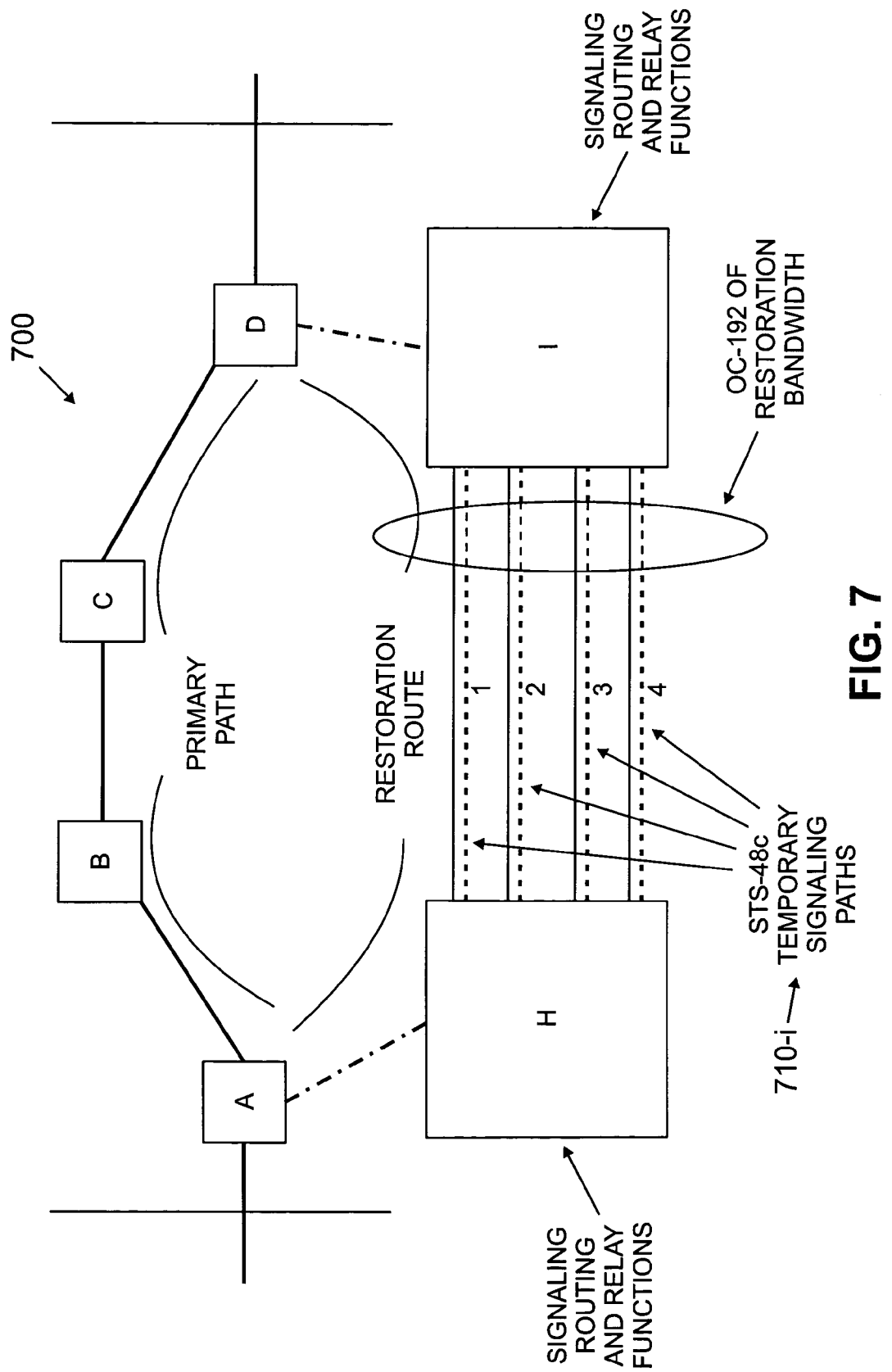
FIG. 7 illustrates the signaling of pre-computed path information along signaling paths using the path overhead or payload in accordance with the present invention.

Thus, a multiple replaceable paths architecture is utilized for node-to-node signaling, as illustrated in FIG. 7. With the disclosed multiple replaceable paths architecture, any two adjacent restoration nodes, for example, nodes H and I, create SONET paths, 710-$i$, for restoration signaling in the restoration (or "spare") bandwidth that lies between them. (In FIG. 7, four paths, labeled 1, 2, 3 and 4, are shown.) The restoration nodes originate and terminate these SONET paths. The paths extend between pairs of adjacent restoration nodes and pass transparently through any intervening non-conforming SONET network elements because the non-conforming network elements do not terminate the paths.

Subsequently, when an end node of a primary path detects an "in-network" path failure as described earlier, it formulates a signaling message that uniquely identifies the failed path and requests set-up of the restoration path. The restoration signaling message is thereafter relayed from one restoration node to another in the overhead or payload of the signaling paths that occupy the exact same bandwidth that is subsequently used by the restoration path. A number of signaling paths may be used in tandem to signal a single path failure; in this case, the intermediate restoration nodes make signaling routing decisions based on information from the pre-computation which they have stored in their routing tables. (They can do this since the signaling message takes the same route through the network as the restoration path.)

Once a signaling message requesting a path restoration is transmitted to an adjacent restoration node using the overhead or payload of a particular signaling path, the restoration node that transmitted the message makes a cross-connect that replaces that signaling path with a segment of the restoration path whose set-up was requested in the transmitted signaling message. At that point, the restoration path is locked in on that link, and the signaling path is no longer available for transmitting messages. If another restoration path set-up message requiring use of the same signaling path is subsequently received at the node (e.g., if there were multiple simultaneous failures in the network), that message cannot be transported. When a signaling message has been relayed through all intermediate nodes on the restoration path and reaches the far-end end node, and that end node makes its final cross-connect and verifies end-to-end connectivity, the failed path is restored.

For example, in FIG. 7, the pre-computed restoration path for primary path ABCD will pass through nodes A, H, I and D. However, until there is a failure of ABCD, this restoration path is not set up. Instead, three signaling paths occupy ABCD's restoration bandwidth on the links between nodes A and H, H and I, and I and D. The overheads or payloads of these paths are used to carry messages signaling the failure of path ABCD, if it should fail. For example, signaling path 2 temporarily occupies ABCD's restoration bandwidth on the link between H and I. Hence, signaling path 2 is designated to transport messages about a failure of primary path ABCD between restoration nodes H and I. Once these messages have been transmitted, the restoration path for ABCD replaces signaling path 2 between nodes H and I. In other words, if the restoration signaling had been initiated starting at node A, once node H has signaled node I using signaling path 2, node H will then connect the segment of the restoration path between A and H to the segment of the restoration path between H and I. Nodes H and I contain functionality to route and relay messages from incoming signaling paths to outgoing signaling paths.

The pre-computation of the present invention totally determines which outgoing signaling path a node should use to route a message about the failure of a particular primary path. This information is stored in the routing tables in the control and memory 77 (FIG. 5) at each node and updated whenever a new pre-computation is completed.

Thus, under the multiple replaceable paths architecture of the present invention, a carrier does not need to plan and administer a separate signaling network. The signaling capabilities are embedded in the restoration bandwidth, wherever it exists, until the bandwidth is used to restore a failed service path. A restoration path follows the same route and occupies the same bandwidth as its signaling paths, thus providing reliability. If the restoration path is available, the signaling paths are also.

Signaling Messages

As previously indicated, signaling messages are formulated by path end nodes when an end node detects an in-network path failure and are relayed from node to node along the restoration route. Signaling messages are simple, indicating for example, only that a failure has occurred, along with the identifier for the path that failed, such as SF-Path#N (i.e., Signal Fail on path number N). Simple messages can be used because, to implement real-time restoration in accordance with the present invention, each restoration node must be able to do two things. First, the node must be able to control its own cross-connect map—that is, it must know which cross-connect to make to establish a restoration path through its fabric. Second, the node must be able to determine where to route a signaling message it receives from another node, i.e., which signaling path should be used to forward the message to the next node. The data each node requires for both these functions is available from the pre-computation. The pre-computation completely determines the restoration path for any given primary path. This pre-computed restoration path is always the same regardless of the type of failure or where it occurs on the primary path. Hence, a request for set-up of the restoration path is implicit in a message that indicates which path failed.

Which path fails completely identifies the restoration actions any given node must take. Hence, one of the outputs of the pre-computation for each restoration node is a routing table that associates each unique path identifier with the cross-connect that must be made at that specific restoration node to restore service in the event that specific path fails. This table would be populated whenever a new pre-computation was completed and stored in the node itself in control and memory so that it could be accessed whenever restoration was initiated. The information stored in the routing table is also used to determine where to route a signaling message received from another node. The information can be used this way because a cross-connect associates a path segment on one SONET line (e.g., the signaling path carrying an incoming path fail message) with a path segment on another SONET line (e.g., the signaling path carrying an outgoing path fail message), and the restoration path uses the same bandwidth as the signaling paths.

The accuracy of a received signaling message can be verified in several ways. For example, a CRC code may be appended to the message, or the message may be repeated at least three times, with the receiver making the indicated cross-connect only after having received the same message twice. It is noted that even with the CRC, it is still desirable for the transmitter to send the message at least twice, to allow for the case where the first transmission of the signaling message was corrupted.

Due to the limited bandwidth available in the SONET path overhead, the restoration signaling messages should remain short. With the multiple replaceable paths signaling of the present invention, it is possible to carry a single restoration message and its associated overhead (e.g., for framing and possibly CRC) in about five bytes, if paths are identified numerically as follows. A unique path number could be assigned to each primary path in the network using a simple hierarchical numbering scheme that (1) assigns a unique number to each restoration node in the network, and (2) identifies a restoration path using one of its end node numbers (e.g., the higher-numbered end node) plus a unique restoration path number within that end node.

It is noted that the F2 byte, or Path User Channel of the SONET path overhead, has been allocated in the SONET standards for end user communications between SONET STS path terminating network elements. The signaling paths used by the present invention exist only between the restoration nodes, and the restoration processing equipment of the present invention is, in effect, the end user of these paths. Thus, placing the signaling messages in the F2 byte of the SONET path overhead can be supported. It is noted that other alternatives exist for transmitting the signaling messages, as would be apparent to a person of ordinary skill in the art.

It is noted that the proposed signaling paths would exist only between restoration nodes that provide restoration functionality in accordance with the present invention and would not be visible outside the network of restoration nodes. Thus, any byte or bytes in the overhead of these signaling paths could be used to transport the signaling messages, provided their use was not essential for other purposes. As noted earlier, signaling path payload could also be used to transport signaling messages.

PRACTICAL EXAMPLE

Consider again the network in FIG. 4. Paths 1 and 2 are primary service paths. Path 1 is a segment of the end-to-end SONET Path 1. SONET Path 1 originates/terminates outside the restorable network and is initially cross-connected through Nodes A, B, C and D within the restorable network. Nodes A and D are the provisioned restoration end nodes of primary Path 1. Path 2 is a segment of the end-to-end SONET Path 2. SONET path 2 originates and terminates outside the restorable network and is initially cross-connected through Nodes E, F and G. Nodes E and G are the provisioned restoration end nodes of primary Path 2. The restoration path for Path 1 extends from Node A through Nodes H, I and D. The restoration path for Path 2 extends from Node E through Nodes H, I and G. Path 1 and Path 2 share restoration bandwidth between H and I.

Action of End Nodes

As an example, assume that the line carrying Path 1 between Nodes B and C is cut. When this happens, Nodes B and C both detect LOS and transmit AIS-P outward along all paths carried on that line. Hence, Node B transmits AIS-P from node B toward node A along SONET Path 1, and Node C transmits AIS-P along SONET Path 1 from node C toward node D. Nodes A and D are the provisioned restoration end nodes for Path 1. Hence, they continually monitor for indications of failure on the path. When an end node detects AIS-P on a path exiting the restorable network, the end node waits for a provisioned period of time to allow local protection mechanisms, e.g., linear Automatic Protection Switching (APS), to take effect, if they are in place. If local protection mechanisms fail to correct the problem or if there are no local protection mechanisms, the problem persists, and the end node initiates restoration signaling in accordance with the present invention.

To initiate restoration signaling, the end node (i) creates a signaling message identifying the path that failed, e.g. SF-Path#1, (ii) does a routing table look-up to determine which outgoing line and signaling path to use for transmitting the signaling message to the next node on the restoration path, and (iii) writes the message at least three times into the overhead or payload of the signaling path. It is noted that if AIS-P is received at both end nodes on Path 1, restoration signaling can be initiated and proceeds from both end nodes toward the middle of the restoration path simultaneously. Allowing the restoration to proceed in this manner reduces total network restoration time by cutting the signaling time by as much as one-half.

After an end node has transmitted the SF-Path#1 message at least three times, the end node generates a command internally instructing its processor to disconnect SONET Path 1 from the primary path and a subsequent command to cross-connect SONET Path 1 to the restoration path. As discussed further below, the cross-connect to the restoration path is initially one-way, providing transmission from the edge of the restorable network toward the center of the restorable network, but not from the restorable network to the outside. When executed, this cross-connect causes the restoration path to replace the signaling path from Node A to Node H. Node A then flags the cross-connect in its database located in control and memory 77 (FIG. 5), to indicate that the associated restoration bandwidth is already in use and cannot be used again to restore another failed path (e.g., one that shares the same restoration bandwidth) without first taking down the cross-connect that has already been made.

It is important to note that, for rapid restoration path set-up, end nodes must initiate signaling to the next node along the restoration path before they execute restoration cross-connects. Executing restoration cross-connects disables the signaling paths. In addition, signaling should proceed as fast as possible across the network, allowing some of the cross-connect processing at nodes along the restoration route to proceed in parallel.

Action of Intermediate Nodes

While the cross-connect command described above is being queued and processed at Node A, the next node on the restoration path, Node H, receives the SF-Path#1 message. Receipt of a second, identical message that confirms the first message triggers a routing table look-up to determine the outgoing line and signaling path for forwarding the message to the next node (Node I) on the restoration path. Restoration signaling and cross-connecting can then proceed as at an end node, with two notable exceptions. First, there are no primary path cross-connections to remove. Second, cross-connections made at intermediate nodes are two-way cross-connections, i.e. they restore both directions of transmission. However, to help prevent misconnections of end-user traffic during real-time restoration, the cross-connect at an end node must initially be a one-way cross-connect so that there is transmission toward the center of the restorable network from the edge of the network, but not from inside the restorable network to the outside. An end node executes a second one-way cross-connect allowing transmission in both directions only after verifying that the identity of the path it is transmitting into the restorable network is the same as the identity of the path it is receiving from the restorable network. This may be done by comparing their SONET Path Traces (J1-byte), as described below.

It is noted that end user SONET Path Terminating Equipment is not required to load identifying information into the Path Trace bytes. The end user may insert null characters into the Path Trace bytes instead. Therefore, to be able to provide the Path Trace comparison described above on restorable paths, during real-time restoration, restoration end nodes must insert information into the J1-byte of the restoration path to identify the primary path being restored. The identifier would be the same one used in the signaling messages, which is unique to each path. The end node continues to insert the primary path identifier into J1 until either (i) it verifies that the path it is transmitting into the network has the same identifier as the one it is receiving from the network, or (ii) it times out. In the case of (i), the end node generates a command internally to execute the second direction of the end-node cross-connect, thus allowing end-user traffic to flow in both directions. In the case of (ii) the node functions as described below in the section entitled "Handling Misconnections."

As previously indicated, the present invention requires some capabilities that are also required by the ANSI Tandem Connection Maintenance standard, T1.105.05-1994. It is not necessary, however, to implement all the capabilities required for ANSI Tandem Connection to implement the present invention. Nonetheless, if a full suite of ANSI Tandem Connection capabilities were available, including the Data Link, some of the proposed capabilities for the present invention would likely change. In particular, the primary path from end node to end node would be identified as a Tandem Connection, and the comparison of Path Traces described above would be replaced with comparison of Tandem Connection Traces.

Handling Misconnections

If within a pre-determined amount of time, e.g. 2 seconds after path restoration has been initiated, an end node determines that the trace of the received path is still not equal to the trace of the transmitted path, then the assumption is restoration has not occurred. There may, in fact, be a misconnection of restoration paths. Most misconnections will likely occur as a result of multiple, simultaneous failures of paths sharing the same restoration bandwidth. Misconnections will not be visible to end users because end nodes on the restoration path verify that the received and transmitted Path Traces are identical before completing their restoration cross-connections and allowing traffic to flow. However, when misconnections do occur, they leave the network in an unknown state, which is undesirable for network providers. Therefore, misconnections must be removed and the network restored to a known state.

When there is a misconnection, three or more end nodes may be involved. To remove misconnections, the affected end nodes transmit signaling messages to take down whichever parts/segments of the (misconnected) restoration paths have been set up. Since misconnections during real-time restoration are expected to be infrequent, recovery from them is not considered as time critical as setting up restoration paths. Hence, signaling to take down misconnected path segments can use OSI messaging over the SONET Section Data Communications Channel (DCC). Use of the SONET Section DCC is desirable because the SONET signaling paths used initially to set up (misconnected) restoration paths are no longer in place along the entire lengths of the restoration routes. They have been replaced by segments of actual restoration paths transmitting end customer path payload and overhead. Hence, the end customer has unrestricted access to these restoration paths and overhead, and as a result, their use for restoration signaling is undesirable from a security perspective.

To take down misconnected path segments using OSI messaging over the SONET Section DCC, each affected end node (i) identifies the restoration path to be removed (e.g., ResPath#5), (ii) determines the next node on this path, and (iii) sends a remove path message, e.g., RM-ResPath#5, to that node using OSI messaging and routing on the SONET DCC. It is noted that the next node on this path is derived from two sources. The first is a table associating all links on the node with the identity of the adjacent restoration node to which those links are connected. This table should be available in control and memory since its information is required input for the pre-computation. The second is the routing table 77 described earlier, that is the output of the pre-computation.

After sending the remove message, the end node does a restoration table look-up to determine which local cross-connect must be removed (i.e., disconnected) to take down ResPath#5. The end node then generates and executes a command that removes the identified cross-connect. If that cross-connect is not in place (e.g., it was taken down by a previous command from another source), the remove command is denied. In either case, ResPath#5 no longer flows through the node. After the restoration path cross-connect is removed, the end node re-establishes the signaling path in the restoration bandwidth.

Each intermediate node that subsequently receives the remove path message determines the next node on the restoration path and forwards the remove message to that node via the DCC. After forwarding the message, the node queries its own restoration table to determine which local cross-connect to remove, generates and executes a command that removes it, and sends a confirmation to the node from which it received the remove message. (If the node finds the cross-connect that is to be removed is not in place, it simply denies the remove command.) The node then re-establishes the signaling path in the restoration bandwidth previously occupied by the (misconnected) restoration path. When the far-end node finally receives the remove path message, it queries its tables and takes down the local cross-connect. The misconnection is effectively removed when the remove messages have been processed at all nodes on all affected restoration paths and the corresponding signaling paths have been re-established.

After clearing a misconnection, end nodes can re-initiate signaling to restore affected failed paths. To help prevent the same misconnection from occurring a second time, each of the end nodes waits for a randomly selected length of time before attempting to set-up a restoration path again.

Handling Paths With Priorities

In the processor of a restoration node, restoration cross-connect commands would normally be queued and processed in the order in which they are generated. Once a restoration path has been set up for one failed path, it will not be possible to "bump" that path off the restoration bandwidth and replace it with another path having higher priority (e.g., as in an analogous 1XN linear APS). However, it is possible to provide high-priority paths with some degree of priority in the restoration processing. This could be done by creating two queues at each node, one for high-priority cross-connects (i.e., those associated with failed high-priority paths) and one for standard cross-connects (i.e., those not associated with high-priority paths). As long as there are cross-connect commands in the high-priority queue, the processor acts on these first. When the high-priority queue is empty, the processor processes standard cross-connect commands. Although this procedure does not guarantee that high-priority paths will be restored before standard paths, it raises the probability that at any given node a high priority path will seize restoration bandwidth before a lower priority path, thus increasing the overall probability that high priority paths will be restored first.

It is also noted that if a primary path absolutely must be restored in the event of a failure, then it can be assigned a dedicated restoration path during the pre-computation. Since the restoration path is dedicated, it may be provisioned at the same time the primary path is provisioned and service permanently bridged onto it. With a permanent bridge at one end of the path and a selector function at the other, ring-like restoration speeds (i.e., 50 msec) can be achieved.

Disconnecting Restorable Paths

It will sometimes be necessary to remove a restorable primary path that has no faults or performance degradation, e.g., when a customer's service is disconnected. However, attempting to take down a restorable path by removing individual cross-connects along the primary path would likely result in the end nodes initiating signaling to set up the restoration path. Hence, restoration nodes should deny technician-generated commands to remove individual cross-connects at a node if the cross-connects are part of a restorable path.

Instead, the signaling technique discussed earlier for removing misconnections should be used to remove restorable paths. In this case, however, the signaling is triggered by a technician's command to remove a path, e.g., RM-Path#7, entered at one of the path end nodes. The end node puts a flag on the path to inhibit restoration signaling from being triggered, and then begins the process of removing Path#7 by doing a table look-up to determine the next node on the path. Signaling and removal of cross-connects can proceed in the same way as described for removing misconnections.

Capabilities for Multiple Replaceable Paths on Restoration Nodes

To provide the functions described above for real-time node-to-node signaling using the multiple replaceable paths signaling architecture, the capabilities of the restoration nodes must include the ability to:

(i) monitor for path failures at the end nodes, as described earlier, (ii) originate and terminate SONET paths for use in signaling in the restoration bandwidth between two restoration nodes, including establishing/locating SONET Path Pointers and Overhead bytes. These SONET paths should be active in the restoration (or spare) bandwidth' when there is no restoration path occupying the bandwidth, (iii) provide read and write access to the Path User Channel (F2) or some other acceptable path overhead byte or bytes, or to path payload, for the purpose of transmitting real-time restoration signaling messages on the signaling paths described above, (iv) incorporate and then populate signaling routing tables and other restoration tables, using data that is either downloaded from a centrally calculated pre-computation or from a distributed pre-computation, (v) route real-time restoration path set-up messages based on received message content and subsequent routing table look-up, (vi) format messages to remove paths and to confirm their removal, and to route these messages using OSI on the SONET Section DCC, (vii) internally generate either a cross-connect or disconnect command based on information obtained from the content of a received signaling message and subsequent restoration table look-up, queue and execute the command, (viii) if an end node, transmit the identity of the primary path being restored into the path trace (J1-byte) of the restoration path, (ix) if an end node, monitor the restoration path trace in the received direction and compare it with the transmitted path trace for instances of misconnections and other anomalies, as well as for successful restoration of failed or degraded paths, (x) if an end node, initiate back-out procedures in the event of a misconnect, (xi) if an end node, initiate removal of paths on command from a user interface, and (xii) provide priority processing, as described earlier in this document.

It is to be understood that the embodiments and variations shown and described herein are merely illustrative of the principles of this invention and that various modifications may be implemented by those skilled in the art without departing from the scope and spirit of the invention.

We claim:

1. A method for restoring a service path in a network having at least one non-conforming element, said service path having a pre-computed restoration path, said pre-computed restoration path having at least one segment, said method comprising the steps of:

detecting a restorable failure along said service path; and signaling the restoration of said failure using at least one signaling path that occupies the same bandwidth as said pre-computed restoration path, each of said at least one signaling paths being replaced by a segment of said pre-computed restoration path after signaling is complete and wherein said at least one signaling path transits said at least one non-conforming network element.

2. The method of claim 1, wherein said network is a SONET network.

3. The method of claim 1, wherein said network is an SDH network.

4. The method of claim 1, wherein said network is an optical network having nodes capable of accessing digital overhead on said paths.

5. The method of claim 1, wherein said signaling step is initiated by an end-node along said service path.

6. The method of claim 1, further comprising the step of distinguishing a restorable failure from a non-restorable failure to determine whether to activate said restoration.

7. The method of claim 1, wherein a signaling message is transmitted in an overhead portion of said at least one signaling path.

8. The method of claim 1, wherein a signaling message is transmitted in a payload portion of said at least one signaling path.

9. The method of claim 1, wherein a signaling message identifies said service path having said failure and requests the establishment of said pre-computed restoration path.

10. The method of claim 9, wherein said signaling message is relayed from one restoration node to another node in the overhead or payload of said at least one signaling path, based on an identity of a failed service path identified in said signaling message.

11. The method of claim 10, further comprising the step of establishing a cross-connect that replaces said at least one signaling path with a segment of the pre-computed restoration path requested in the signaling message, said establishing step being performed after relaying said signaling message to a subsequent restoration node.

12. The method of claim 1, wherein a non-restorable failure is indicated using a flag in a path overhead field.

13. The method of claim 1, further comprising the step of determining if said failure is a restorable failure using criteria from the ANSI Tandem Connection Maintenance standard.

14. The method of claim 1, wherein said network is a restorable network within a larger multi-network environment and wherein said signaling step is initiated only when the fault causing said path failure is located within the restorable network.

15. The method of claim 1, wherein customer path terminating equipment is not part of a restorable network, and wherein said signaling step is initiated only when the fault causing said path failure is located within said restorable network.

16. The method of claim 1, wherein adjacent restoration nodes in said network initiate and terminate paths that are used for signaling in spare network bandwidth, wherein said signaling paths remain in place for signaling until replaced by said pre-computed restoration paths used to restore service.

17. The method of claim 1, wherein end nodes are identified for said service path when said service path is initially provisioned.

18. The method of claim 17, wherein said end nodes monitor for said path failures and initiate restoration signaling only when said path failure is due to a fault located between the end nodes.

19. The method of claim 17, wherein said end nodes (i) formulate a restoration message uniquely identifying said failed service path and requesting set-up of said pre-computed restoration path, and (ii) route said message to a subsequent restoration node.

20. The method of claim 17, wherein said end nodes permit traffic to flow out of the network on a restored path only after verifying both end node-to-end node connectivity and an identity of the restored path.

21. A method for restoring a service path in a network having at least one non-conforming element, said service path having a pre-computed restoration path, said pre-computed restoration path having at least one segment, said method comprising the steps of:
   detecting a failure along said service path;
   determining if said failure is a restorable failure;
   signaling the restoration of said restorable failure using at least one signaling path that follows said pre-computed restoration path, said pre-computed restoration path segments replacing said at least one signaling paths after signaling is complete and wherein said at least one signaling path transits said at least one non-conforming network element; and
   connecting said pre-computed restoration path.

22. The method of claim 21, wherein said network is a SONET network.

23. The method of claim 21, wherein said network is an SDH network.

24. The method of claim 21, wherein said network is an optical network having nodes capable of accessing digital overhead on said paths.

25. The method of claim 21, wherein said signaling step is initiated by an end-node along said service path.

26. The method of claim 21, further comprising the step of distinguishing a restorable failure from a non-restorable failure to determine whether to activate said restoration.

27. The method of claim 21, wherein a signaling message is transmitted in an overhead portion of said at least one signaling path.

28. The method of claim 21, wherein a signaling message is transmitted in a payload portion of said at least one signaling path.

29. The method of claim 21, wherein a signaling message identifies said service path having said failure and requests the establishment of said pre-computed restoration path.

30. The method of claim 29, wherein said signaling message is relayed from one restoration node to another node in the overhead or payload of said at least one signaling path, based on an identity of a failed service path identified in said signaling message.

31. The method of claim 30, further comprising the step of establishing a cross-connect that replaces said at least one signaling path with a segment of the pre-computed restoration path requested in the signaling message, said establishing step being performed after relaying said signaling message to a subsequent restoration node.

32. The method of claim 21, wherein a non-restorable failure is indicated using a flag in a path overhead field.

33. The method of claim 21, further comprising the step of determining if said failure is a restorable failure using criteria from the ANSI Tandem Connection Maintenance standard.

34. The method of claim 21, wherein said network is a restorable network within a larger multi-network environment and wherein said signaling step is initiated only when the fault causing said path failure is located within the restorable network.

35. The method of claim 21, wherein customer path terminating equipment is not part of a restorable network, and wherein said signaling step is initiated only when the fault causing said path failure is located within said restorable network.

36. The method of claim 21, wherein adjacent restoration nodes in said network initiate and terminate paths that are used for signaling in spare network bandwidth, wherein said signaling paths remain in place for signaling until replaced by said pre-computed restoration paths used to restore service.

37. The method of claim 21, wherein end nodes are identified for said service path when said service path is initially provisioned.

38. The method of claim 37, wherein said end nodes monitor for said path failures and initiate restoration signaling only when said path failure is due to a fault located between the end nodes.

39. The method of claim 37, wherein said end nodes (i) formulate a restoration message uniquely identifying said failed service path and requesting set-up of said pre-computed restoration path, and (ii) route said message to a subsequent restoration node.

40. The method of claim 37, wherein said end nodes permit traffic to flow out of the network on a restored path only after verifying both end node-to-end node connectivity and an identity of the restored path.

41. A system for restoring a service path in a network having at least one non-conforming element, said service path having a pre-computed restoration path, said pre-computed restoration path having at least one segment, said system comprising:
   a memory for storing computer-readable code; and
   a processor operatively coupled to said memory, said processor configured to:
   detect a restorable failure along said service path; and
   signal the restoration of said failure using at least one signaling path that occupies the same bandwidth as said pre-computed restoration path, each of said at least one signaling paths being replaced by a segment of said pre-computed restoration path after signaling is complete and wherein said at least one signaling path transits said at least one non-conforming network element.

42. A system for restoring a service path in a network having at least one non-conforming element, said service path having a pre-computed restoration path, said pre-computed restoration path having at least one segment, said system comprising:
   a memory for storing computer-readable code; and
   a processor operatively coupled to said memory, said processor configured to:
   detect a failure along said service path;
   determine if said failure is a restorable failure;
   signal the restoration of said restorable failure using at least one signaling path that follows said pre-computed restoration path, said pre-computed restoration path segments replacing said at least one signaling paths after signaling is complete and wherein said at least one signaling path transits said at least one non-conforming network element; and
   connect said pre-computed restoration path.

* * * * *